(12) United States Patent
Zhang et al.

(10) Patent No.: US 12,071,349 B2
(45) Date of Patent: Aug. 27, 2024

(54) COMPOSITE AEROGEL BASED ON GRAPHDIYNE MOTIF ARRANGEMENT AND PREPARATION METHOD THEREOF

(71) Applicant: University of Science and Technology Beijing, Beijing (CN)

(72) Inventors: Yue Zhang, Beijing (CN); Zhaozhao Xiong, Beijing (CN); Zhuo Kang, Beijing (CN); Fulong Dai, Beijing (CN); Shuang Hu, Beijing (CN); Kaikai Ma, Beijing (CN); Yifan Zhao, Beijing (CN); Yaxin Pan, Beijing (CN); Xiao Hu, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 0 days.

(21) Appl. No.: 18/398,077

(22) Filed: Dec. 27, 2023

(65) Prior Publication Data

US 2024/0228297 A1    Jul. 11, 2024

(30) Foreign Application Priority Data

Jan. 9, 2023    (CN) .......................... 202310026797.1

(51) Int. Cl.
  *C01B 32/194*    (2017.01)
  *B01D 1/00*    (2006.01)
  (Continued)

(52) U.S. Cl.
  CPC .......... *C01B 32/194* (2017.08); *B01D 1/0035* (2013.01); *B01J 13/0091* (2013.01);
  (Continued)

(58) Field of Classification Search
  CPC ..... C01B 32/15; C01B 32/182; C01B 32/184; C01B 32/19; C01B 32/192; C01B 32/194;
  (Continued)

(56) References Cited

U.S. PATENT DOCUMENTS

| | | |
|---|---|---|
| 2014/0370274 A1 | 12/2014 | Lee |
| 2019/0326592 A1* | 10/2019 | Tomassone ............... B01J 13/08 |
| 2022/0220008 A1* | 7/2022 | Lee ......................... C02F 1/048 |

FOREIGN PATENT DOCUMENTS

| | | | |
|---|---|---|---|
| CN | 102757040 A | * | 10/2012 |
| CN | 104401979 A |  | 3/2015 |

(Continued)

OTHER PUBLICATIONS

Zheng et al. ("Hydrogen-substituted graphdiyne-assisted ultrafast sparking synthesis of metastable nanomaterials", Nature Nanotechnology, 18, 2023, 153-159) (Year: 2022).*

(Continued)

*Primary Examiner* — Matthew R Diaz
(74) *Attorney, Agent, or Firm* — Piloff Passino & Cosenza LLP; Rachel K. Piloff; Sean A. Passino

(57) ABSTRACT

A composite aerogel based on graphdiyne motif arrangement and a preparation method thereof are provided by the embodiments of the disclosure, belonging to the technical field of photothermal evaporation materials, including firstly growing graphdiyne on a surface of the graphene oxide to obtain a graphdiyne-coated graphene oxide, taking an additional graphene oxide, adding the additional graphene oxide and the graphdiyne-coated graphene oxide obtained by the coupling reaction into pure water, and ultrasonically mixing to obtain a mixed dispersion, adding a polyvinyl alcohol aqueous solution into the mixed dispersion, and transferring to a reaction kettle after ultrasonic mixing, putting the reaction kettle after sealing into a blast drying box for hydrothermal reaction to obtain a gel structure, and cleaning the gel structure, and freeze-drying to obtain a composite aerogel containing graphdiyne-coated reduced graphene oxide and reduced graphene oxide.

5 Claims, 9 Drawing Sheets

(51) Int. Cl.
  *B01J 13/00* (2006.01)
  *C01B 32/198* (2017.01)
  *C02F 1/14* (2023.01)

(52) U.S. Cl.
  CPC .............. *C01B 32/198* (2017.08); *C02F 1/14* (2013.01); *C01P 2004/04* (2013.01)

(58) Field of Classification Search
  CPC .. C01B 32/198; B01D 1/0029; B01D 1/0035; B01J 13/0091; B32B 2266/126; B82Y 30/00; B82Y 40/00; C02F 1/04; C02F 1/14
  See application file for complete search history.

(56) References Cited

FOREIGN PATENT DOCUMENTS

| CN | 109860536 | A |   | 6/2019  |                 |
|----|-----------|---|---|---------|-----------------|
| CN | 111939175 | A | * | 11/2020 | ............. A61K 33/44 |
| CN | 112999891 | A | * | 6/2021  | ........... B01D 61/362 |
| CN | 113368250 | A | * | 9/2021  |                 |
| CN | 114085523 | A | * | 2/2022  | ............. C08K 3/042 |
| CN | 114247305 | A | * | 3/2022  | .......... B01J 13/0065 |
| CN | 112934129 | B | * | 8/2022  | .......... B01J 13/0065 |
| CN | 115400699 | A | * | 11/2022 | .......... B01J 13/0091 |
| JP | 2004285279 | A | * | 10/2004 |                |

OTHER PUBLICATIONS

Liu et al. ("Graphdiyne aerogel architecture via a modified Hiyama coupling reaction for gas adsorption", Chem. Commun., 2023, 59, 2165-2168) (Year: 2023).*

First Office Action for China Application No. 202310026797.1, mailed Mar. 7, 2023.

Notification to Grant Patent for China Application No. 202310026797.1, mailed Mar. 22, 2023.

First Search Report for China Application No. 202310026797.1, dated Mar. 6, 2023.

First Search Report for China Application No. 202310026797.1, dated Mar. 20, 2023.

* cited by examiner

COMPOSITE AEROGEL BASED ON GRAPHDIYNE MOTIF ARRANGEMENT AND PREPARATION METHOD THEREOF

CROSS-REFERENCE TO RELATED APPLICATIONS

This application claims priority to Chinese Patent Application No. 202310026797.1, filed on Jan. 9, 2023, the contents of which are hereby incorporated by reference.

TECHNICAL FIELD

The present disclosure relates to the field of photothermal evaporation materials, and in particular to a composite aerogel based on graphdiyne motif arrangement and a preparation method thereof.

BACKGROUND

The increasingly acute shortage of freshwater resources may be alleviated by the application of seawater desalination technology. An important component of a desalination device is a photothermal evaporation material, which is used to convert absorbed sunlight into heat to thermally evaporate seawater. In the existing technology, graphene material is one of the commonly used photothermal evaporation materials for its capability of absorbing sunlight in a wide range of wavelength as a result of its zero-bandgap energy level structure.

However, it is found that the graphene material also has the characteristics of high thermal conductivity and fast heat transfer, meaning that some of the heat in the heat generated from the absorption of sunlight by the graphene-based photothermal evaporation material tends to be dissipated into the water, resulting in a reduction of the heat in the evaporation of water, which leads to a low efficiency of the photothermal conversion thereof. Such a problem is particularly prominent in the case of insufficient light conditions and little light heat production, which limits the wide application of the material.

SUMMARY

In view of this, the embodiments of the present disclosure provide a composite aerogel based on graphdiyne motif arrangement and a preparation method thereof, whereby graphdiyne-coated reduced graphene oxide is dispersed in an aerogel structure, so as to suppress the dissipation of heat and improve the efficiency of the photo-thermal conversion when evaporating water.

In an aspect, an embodiment of the present disclosure provides a preparation method of a composite aerogel based on graphdiyne motif arrangement, adopting a following technical scheme.

The preparation method of the composite aerogel based on graphdiyne motif arrangement includes following steps:

step S1, performing coupling reaction on graphene oxide and hexaethynyl benzene monomer, and growing graphdiyne on a surface of the graphene oxide to obtain a graphdiyne-coated graphene oxide;

step S2, taking an additional graphene oxide, adding the additional graphene oxide and the graphdiyne-coated graphene oxide obtained by the coupling reaction into pure water, and ultrasonically mixing to obtain a mixed dispersion;

step S3, adding a polyvinyl alcohol aqueous solution into the mixed dispersion, and transferring to a reaction kettle after ultrasonic mixing;

step S4, putting the reaction kettle after sealing into a blast drying box for hydrothermal reaction to obtain a gel structure; and step S5, cleaning the gel structure, and freeze-drying to obtain a composite aerogel containing graphdiyne-coated reduced graphene oxide and reduced graphene oxide.

Optionally, in the step S2, a mass ratio of the additional graphene oxide to the graphdiyne-coated graphene oxide obtained by the coupling reaction is 3-5.

Optionally, in the step S2, a total concentration of the graphene oxide and the graphdiyne-coated graphene oxide in the mixed dispersion is 0.001 gram per milliliter (g/mL) to 0.01 g/mL.

Optionally, in the step S4, the reaction kettle is a stainless steel autoclave, and the stainless steel autoclave is put into a blast drying box to be heated to 130-200 degrees Celsius (° C.) and reacted for 7-16 hour (h) to obtain the gel structure.

Optionally, in the step S5, the gel structure is washed with ethanol and deionized water, and the gel structure after washing is pre-frozen at $-10°$ C.$--20°$ C. until there is no separated liquid on a surface of the gel structure, and then transferred to $-30°$ C.$--80°$ C. for freeze-drying to obtain the composite aerogel containing graphdiyne-coated reduced graphene oxide and reduced graphene oxide.

Optionally, the step S1 includes:

transferring a three-necked flask to an oil bath at 30° C.-60° C. and ventilating under an argon atmosphere for 5 minutes (min)-10 min;

taking graphene oxide, and mixing graphene oxide, pyridine and copper acetate together in the three-necked flask;

inserting a dropping funnel containing hexaethynyl benzene monomer solution into a caliber of the three-necked flask, dropwise adding droppings into a mixed solution in the three-necked flask, and completely reacting in a dark to obtain a dispersion containing graphdiyne-coated graphene oxide nanosheets;

carrying out centrifugal suction-filtration on the dispersion containing graphdiyne-coated graphene oxide nanosheets with pyridine, dimethylformamide, ethanol, hydrochloric acid and deionized water in turn to obtain graphdiyne-coated graphene oxide nanosheets; and drying the graphdiyne-coated graphene oxide nanosheets obtained by suction-filtration to obtain powdered graphdiyne-coated graphene oxide.

Optionally, synthesizing hexaethynyl benzene monomer from hexakis-[(trimethylsilyl)ethynyl]benzene is also included before the step S1, and a mass ratio of hexakis-[(trimethylsilyl)ethynyl]benzene needed for synthesizing hexaethynyl benzene monomer in the step S1 to graphene oxide in the step S1 is 2/5-8/5.

In another aspect, an embodiment of the present disclosure provides a composite aerogel containing graphdiyne-coated reduced graphene oxide and reduced graphene oxide prepared by the above-mentioned preparation method of the composite aerogel based on graphdiyne motif arrangement.

An embodiment of the disclosure provides a composite aerogel based on graphdiyne motif arrangement and a preparation method thereof, the preparation method includes following steps: performing coupling reaction on graphene oxide and hexaethynyl benzene monomer firstly, and growing graphdiyne on a surface of the graphene oxide to obtain a graphdiyne-coated graphene oxide; taking an additional graphene oxide, adding the additional graphene oxide and the graphdiyne-coated graphene oxide obtained by the coupling reaction into pure water, and ultrasonically mixing to obtain a mixed dispersion; adding a polyvinyl alcohol aqueous solution into the mixed dispersion, and transferring to a reaction kettle after ultrasonic mixing; putting the reaction kettle after sealing into a blast drying box for hydrothermal reaction to obtain a gel structure; and cleaning the gel structure, and freeze-drying to obtain a composite aerogel containing graphdiyne-coated reduced graphene oxide and reduced graphene oxide. On the one hand, by uniformly dispersing graphdiyne-coated reduced graphene oxide and reduced graphene oxide in the form of nanosheets into an aerogel structure formed by cross-linking of polyvinyl alcohol, the inner layer of reduced graphene oxide transfers heat to the outer layer of graphdiyne after heat production when there is light, and by the low thermal conductivity of graphene, it is possible to inhibit the continual dissipation of the heat to an external body of water, so as to concentrate the heat in the nanosheets and the aerogel structure, and to exhibit a high efficiency of the light-to-heat conversion. On the other hand, in the case of little light-generated heat, the heat dissipated to an external body of water is reduced, indicating that the heat used for water evaporation is increased, and thus the composite aerogel containing graphdiyne-coated reduced graphene oxide and reduced graphene oxide prepared by the preparation method also has the advantage of high water evaporation performance under low light relative to other materials, offering a promising prospect for application in harsh outdoor environments. Moreover, since graphdiyne is electronegative and repels chloride ions, the composite aerogel with graphdiyne-based motif sequence prepared by this preparation method also has good salt resistance and self-cleaning capability.

The above description is only an overview of the technical schemes of the present disclosure, in order to have a clearer understanding of the technical means of the present disclosure, which can be implemented in accordance with the contents of the specification, and in order to make the above and other purposes, features and advantages of the present disclosure more obvious and easy to understand, the following preferred embodiments are described in detail below, together with the accompanying drawings.

BRIEF DESCRIPTION OF THE DRAWINGS

In order to more clearly illustrate the technical schemes of the embodiments of the present disclosure, the accompanying drawings to be used in the embodiments are briefly described below, and it is obvious that the accompanying drawings in the following description are only some of the embodiments of the present disclosure, and that for a person of ordinary skill in the art, other accompanying drawings are available on the basis of the accompanying drawings without creative labour.

FIG. 6 is a comparison diagram of evaporating efficiency and photothermal conversion efficiency provided by an embodiment of the present disclosure.

DETAILED DESCRIPTION OF THE EMBODIMENTS

Figure 1:
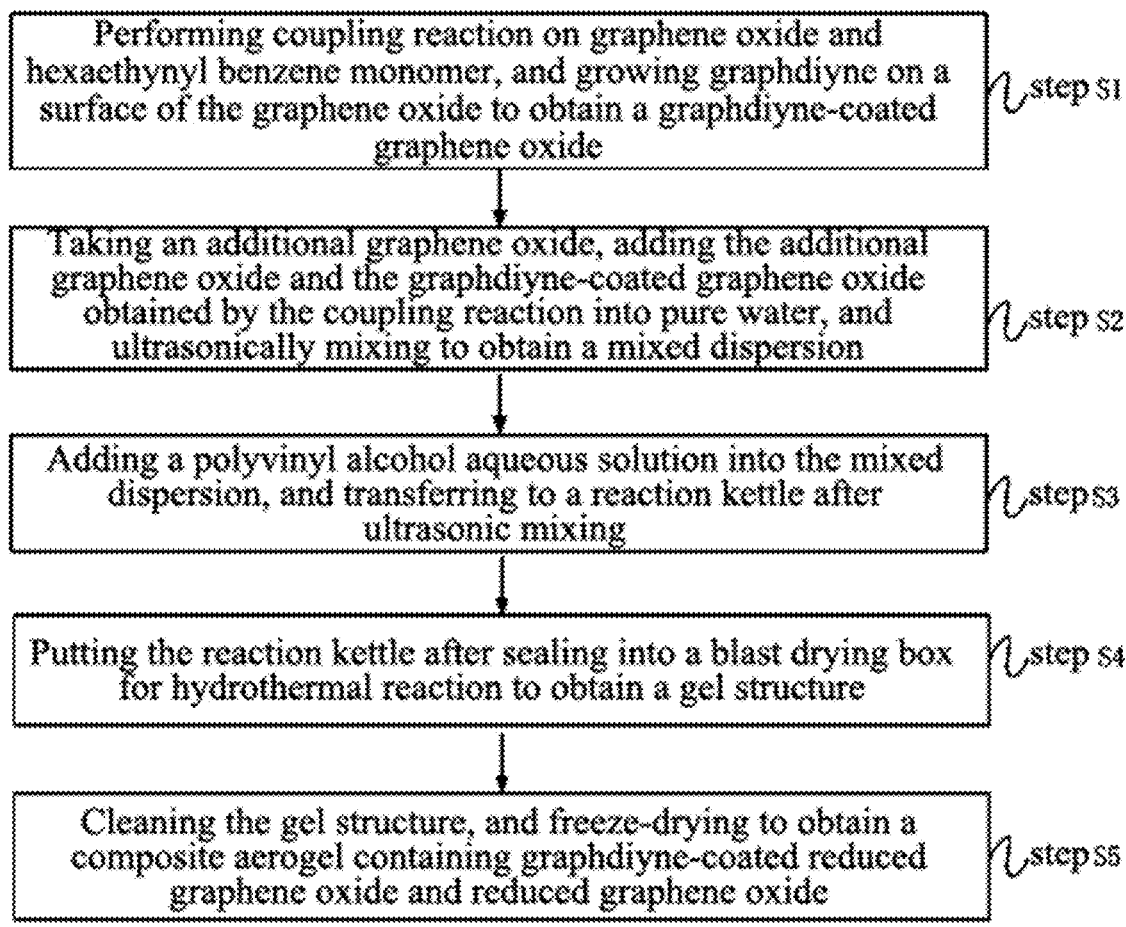
FIG. 1 is a process of a preparation method provided by an embodiment of the present disclosure.
Figure 2A:
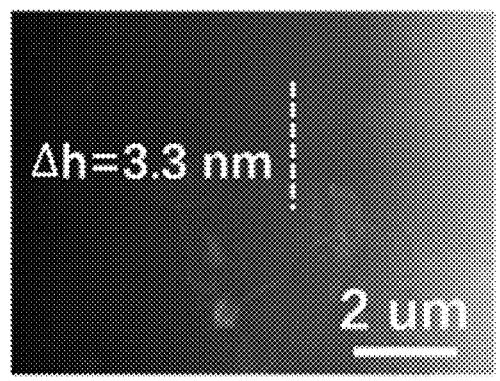
FIG. 2A is an atomic force microscope image of GO nanosheet provided by an embodiment of the present disclosure.
Figure 2B:
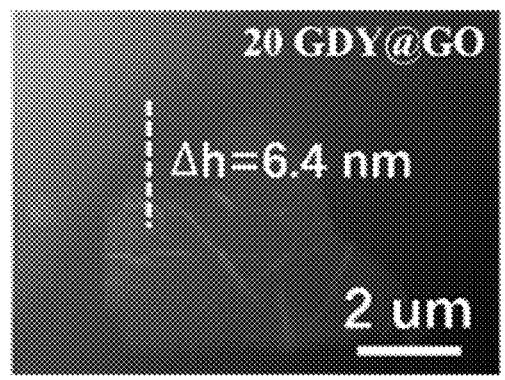
FIG. 2B is an atomic force microscope image of GDY@GO nanosheets with 20 mg HEB-TMS provided by an embodiment of the present disclosure.
Figure 2C:
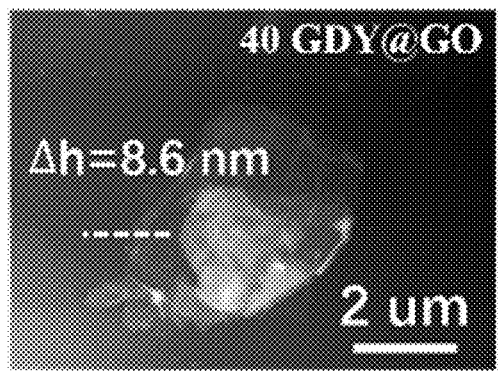
FIG. 2C is an atomic force microscope image of GDY@GO nanosheets with 40 mg HEB-TMS provided by an embodiment of the present disclosure.
Figure 2D:
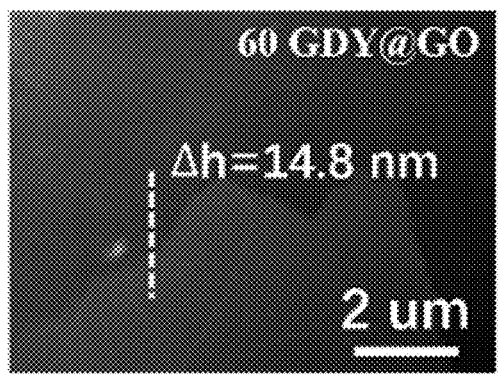
FIG. 2D is an atomic force microscope image of GDY@GO nanosheets with 60 mg HEB-TMS provided by an embodiment of the present disclosure.
Figure 2E:
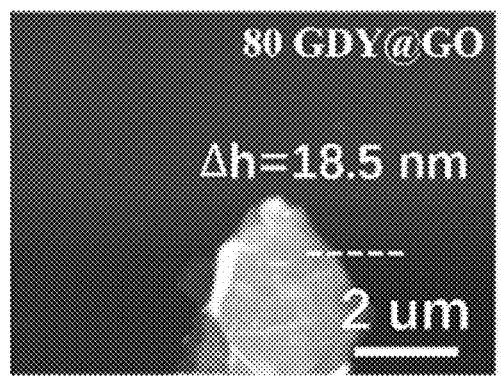
FIG. 2E is an atomic force microscope image of GDY@GO nanosheets with 80 mg HEB-TMS provided by an embodiment of the present disclosure.

The present disclosure is described in further detail below in connection with the accompanying drawings and embodiments. It is to be understood that the specific embodiments described herein are only for the purpose of explaining the relevant contents, and are not a limitation of the present disclosure. It is also to be noted that for ease of description, only portions relevant to the present disclosure are shown in the accompanying drawings.

It should be noted that the embodiments in this disclosure and the features in the embodiments may be combined with each other without conflict. Hereinafter, the technical schemes of the present disclosure are described in detail with reference to the drawings and in combination with the embodiments.

Unless otherwise specified, the illustrated exemplary implementation/embodiments are to be understood as exemplary features that provide various details of some ways in which the technical concepts of the present disclosure may be implemented in practice. Therefore, unless otherwise specified, features of various implementation/embodiments may be additionally combined, separated, interchanged and/or rearranged without departing from the technical concept of this disclosure.

The terminology used herein is for the purpose of describing specific embodiments and is not intended to be limiting. As used herein, the singular forms "a (an)" and "the" are also intended to include the plural forms unless the context clearly indicates otherwise. Furthermore, when the terms "including" and/or "comprising" and their variants are used in this specification, it is stated that the stated features, integers, steps, operations, components, modules and/or their groups exist, but the existence or addition of one or more other features, integers, steps, operations, components, modules and/or their groups is not excluded. It is also noted that, as used herein, the terms "substantially", "about" and other similar terms are used as approximate terms instead of degree terms, and as such, they are used to explain the inherent deviation of measured values, calculated values and/or provided values that will be recognized by those skilled in the art.

It is found that, in contrast to the high thermal conductivity of graphene, graphdiyne has a ring-chain separated structure in which the phonon vibration modes of the benzene ring and the alkyne chain are mismatched, making it difficult to transfer the energy of neighbouring atoms, and has an extremely low thermal conductivity, thus reducing the heat loss in evaporating water, making it ideally suited for use as a material for photo-thermal evaporation.

However, it is currently not possible to prepare pure graphdiyne aerogel due to the limitation of the growth conditions of graphdiyne. To this end, the inventors consider using graphene as a medium to grow graphdiyne on graphene, and first make graphdiyne-coated graphylene oxide motif nanosheets, and then make an aerogel based on the graphdiyne motif arrangement, so as to realize the application of graphdiyne in the field of photo-thermal evaporation materials. Besides, the cost of graphdiyne is relatively high, and the introduction of graphene enables to reduce the cost compared with the pure graphdiyne aerogel as well.

Based on the above analysis, the embodiments of the present disclosure provide a preparation method of composite aerogel based on graphdiyne motif arrangement. Specifically, as shown in FIG. 1, the preparation method of the composite aerogel based on graphdiyne motif arrangement includes:

step S1, performing coupling reaction on graphene oxide and hexaethynyl benzene monomer, and growing graphdiyne on a surface of the graphene oxide to obtain a graphdiyne-coated graphene oxide.

It is to be understood that adjusting the mass of the hexaethynylbenzene monomer relative to the graphene oxide is capable of changing the thickness of the graphdiyne growing on the surface of the graphene oxide.

Optionally, the hexaethynyl benzene monomer is synthesized from hexakis-[(trimethylsilyl)ethynyl]benzene.

Optionally, in the synthesis of hexaethynyl benzene monomer from hexakis-[(trimethylsilyl)ethynyl]benzene, the mass ratio of hexakis-[(trimethylsilyl)ethynyl]benzene required for synthesising the hexaethynyl benzene monomer in the step S1 and graphene oxide taken in the step S1 may be from 2/5 to 8/5, and exemplarily, graphene oxide is taken to be 50 mg, and the mass of hexakis-[(trimethylsilyl) ethynyl]benzene may be varied from 20 mg to 80 mg, the mass ratio in this range enables the graphdiyne to grow smoothly on the surface of the graphene oxide with an appropriate thickness.

Optionally, the step S1 includes the following steps: transferring a three-necked flask to an oil bath pot at 30-60 degrees Celsius (° C.), and aerating for 5-10 minutes (min) in argon atmosphere; taking graphene oxide, adding the graphene oxide, pyridine and copper acetate into the three-necked flask and mixing; inserting a dropping funnel containing hexaethynyl benzene monomer solution into a caliber of the three-necked flask, dropwise adding droppings into a mixed solution in the three-necked flask, and completely reacting in a dark to obtain a dispersion containing graphdiyne-coated graphene oxide nanosheets; centrifuging and suction-filtering the graphdiyne-coated graphene oxide nanosheets with pyridine, dimethylformamide, ethanol, hydrochloric acid and deionized water in turn; drying the graphdiyne-coated graphene oxide nanosheets after the suction-filtering to obtain powdered graphdiyne-coated graphene oxide. In this step, copper acetate is used as a catalyst to grow graphdiyne on the surface of graphene oxide.

Exemplarily, a three-necked flask may be transferred to an oil bath pot at 30° C.-60° C. and ventilated for 5-10 min in an argon atmosphere, followed by adding graphene oxide (50 mg), pyridine (20 milliliters (mL)-80 mL) and copper acetate (20 milligrams (mg)-80 mg) into the three-necked flask for mixing, then inserting a dropping funnel containing hexaethynyl benzene monomer solution into a caliber of the three-necked flask, dropping drops into a mixed solution in the three-necked flask, and completely reacting in a dark to obtain a dispersion containing graphdiyne-coated graphene oxide nanosheets; the graphdiyne-coated graphene oxide nanosheets is subjected to centrifuge and suction-filtering with pyridine, dimethylformamide, ethanol, hydrochloric acid and deionized water in turn, and the graphdiyne-coated graphene oxide nanosheets after suction-filtering is dried to obtain powdered graphdiyne-coated graphene oxide.

Step S2, taking an additional graphene oxide, adding the additional graphene oxide and the graphdiyne-coated graphene oxide obtained by the coupling reaction into pure water, and ultrasonically mixing to obtain a mixed dispersion.

Optionally, in the step S2, a mass ratio of the additional graphene oxide to the graphdiyne-coated graphene oxide obtained by the coupling reaction may be 1/5 to 1/3. The introduction of graphene oxide in this step may increase the content of oxide groups, and the mass ratio in this range enables the content of oxide groups to be moderate, which is beneficial to the uniform dispersion of graphdiyne coating elements in aerogel structure. Optionally, in the step S2, the total concentration of graphene oxide and graphdiyne-coated graphene oxide in the mixed dispersion may be 1 mg/mL to 10 mg/mL, and the concentration in this range allows for a moderate content of graphene oxide and graphdiyne-coated graphene oxide per unit volume, which is favourable for their homogeneous dispersion in the aerogel structure. Exemplarily, the graphene oxide and the graphdiyne-coated graphene oxide obtained from the coupling reaction in the step S2 may be dispersed in pure water at a concentration of 3 mg/mL, and ultrasonicated for 6 hours (h) to obtain a mixed dispersion.

Step S3, adding polyvinyl alcohol aqueous solution into the mixed dispersion, and transferring to a reaction kettle after ultrasonic mixing.

Optionally, in the step S3, low molecular weight polyvinyl alcohol is used to prepare polyvinyl alcohol aqueous solution. Exemplarily, 1 mL of polyvinyl alcohol solution with a concentration of 0.1 g/mL may be added to the mixed dispersion, and transferred to the reaction kettle after ultrasonic mixing for half an hour. Illustratively, the reaction kettle is a stainless steel autoclave.

Step S4, putting the reaction kettle after sealing into a blast drying box for hydrothermal reaction to obtain a gel structure.

In this step, the gelation process in the blast drying box is essentially the redox reaction of graphene oxide, and the increase of heating temperature and heating duration may increase the proportion of graphene oxide converted into reduced graphene oxide.

Optionally, in the step S4, the stainless steel autoclave may be put into a blast drying box and heated to 130° C.-200° C., and the gel structure may be obtained after reacting for 7-16 h. Such heating temperature range and heating duration range enable the remaining of some oxygen-containing groups in the gel structure formed by the reaction, including carboxyl groups and hydroxyl groups, so as to promote the hydrophilicity of the gel and ensure the water transport capacity thereof in the process of evaporating water. Exemplarily, the stainless steel autoclave may be put into the blast drying box and heated to 180° C., and the gel structure may be obtained after heating for 12 h.

S5, cleaning the gel structure, and freeze-drying to obtain the composite aerogel containing graphdiyne-coated reduced graphene oxide and reduced graphene oxide.

Optionally, the gel structure may be washed with ethanol and deionized water, and the washed gel structure is pre-frozen at −10° C.-−20° C. until there is no separated liquid on the surface of the gel structure, and then transferred to −30° C.-80° C. for freeze-drying to obtain the composite aerogel containing graphdiyne-coated reduced graphene oxide and reduced graphene oxide.

Exemplarily, the gel structure after washing may be pre-frozen at −20° C. for 8-12 h until there is no separated liquid on the surface of the gel structure, and then transferred to a freeze-dryer at −60° C. for 40-60 h to obtain a composite aerogel containing graphdiyne-coated reduced graphene oxide and reduced graphene oxide. At this point, too short a freeze-drying duration will not achieve the drying effect, and too long a freeze-drying duration will result in the gel structure collapsing and shrinking into a clump.

The preparation method of the composite aerogel based on graphdiyne motif arrangement in the embodiment of the present disclosure has the following advantages.

On the one hand, the graphdiyne-coated reduced graphene oxide and reduced graphene oxide are uniformly dispersed into the aerogel structure formed by polyvinyl alcohol cross-linking in the form of nano-sheets, in this way, when there is a light illumination, the inner layer of reduced graphene oxide will transfer heat to the outer layer of graphdiyne after the heat is produced, and by the effect of the low thermal conductivity of the graphdiyne, the continued dissipation of the heat into the external water body may be suppressed, so as to make the heat concentrated in the nano-sheets and the aerogel structure, exhibiting a high efficiency in photo-thermal conversion.

On the other hand, the reduction in the amount of heat dissipated to an external body of water in the absence of much light-generated heat indicates that the amount of heat used for evaporation of water increases, and thus the composite aerogel containing graphdiyne-coated reduced graphene oxide and reduced graphene oxide prepared by the preparation method also has the advantage of high evaporation performance of water under low light with respect to the other materials.

Moreover, graphdiyne is electronegative and repels chloride ions, so the composite aerogel based on graphdiyne motif arrangement prepared by this preparation method also have good salt resistance and self-cleaning ability.

In addition, the embodiments of the present disclosure provide a composite aerogel containing graphdiyne-coated reduced graphene oxide and reduced graphene oxide, and the composite aerogel is synthesized by any one of the preparation methods of the composite aerogel based on graphdiyne motif arrangement.

In order to facilitate people in the field to know more clearly the performance advantages and synthesis methods of the composite aerogels containing graphdiyne-coated reduced graphene oxide and reduced graphene oxide in the embodiments of the present disclosure, the following embodiments of the present disclosure are illustrated with several specific examples.

Among them, GDY@GO stands for graphdiyne-coated graphene oxide, GDY@rGO stands for graphdiyne-coated reduced graphene oxide, GO stands for graphene oxide, rGO stands for reduced graphene oxide, HEB stands for hexaethynyl benzene, and HEB-TMS stands for hexakis-[(trimethylsilyl)ethynyl]benzene.

The preparation process of the composite aerogel containing GDY@rGO and rGO in this embodiment is as follows:

Embodiment 1

(1) 0.3 mL of tetrabutylammonium fluoride is added into 20 mL of tetrahydrofuran solution containing 20 mg HEB-TMS, and stirred for 14 min at 0° C. in argon atmosphere in the dark; the mixed solution is extracted with saturated sodium chloride solution and ethyl acetate while shaking, and stood for layering, with the lower liquid discharged, and the operation is repeated for three times; the obtained solution is filtered and dried with anhydrous magnesium sulfate, and the light yellow monomer HEB is obtained by rotary evaporation with a rotary evaporator;

(2) the three-necked flask is transferred to an oil bath pot at 30-60° C., and aerated for 5-10 min in argon atmosphere; graphene oxide (50 mg), pyridine (20 mL) and copper acetate (20 mg) are added into the three-necked flask, with a dropping funnel containing hexaethynyl benzene monomer solution inserted into the caliber of the three-necked flask, and the drops are added drop by drop into the mixed solution in the three-necked flask, followed by reacting in argon atmosphere in the dark for 24 h to obtain a dispersion with GDY@GO nanosheets; the dispersion with GDY@GO nanosheets is then successively centrifugally filtered with pyridine, dimethylformamide, ethanol, 1M hydrochloric acid and deionized water to obtain GDY@GO nanosheets, and then naturally dried to obtain GDY@GO powder;

(3) another GO nanosheet with 3 times the mass of GDY@GO powder is taken and dispersed with GDY@GO powder in 20 mL of pure water at a concentration of 3 mg/mL, followed by ultrasonic treatment for 6 h; 1 mL of polyvinyl alcohol solution with a concentration of 0.1 g/mL is added to the obtained dispersion, and ultrasonic treatment is continued for half an hour; the mixed dispersion is then transferred to a 50 mL stainless steel autoclave lined with polytetrafluoroethylene and heated at 180° C. for 12 h, and then the gel structure is repeatedly washed with ethanol and deionized water; and (4) the obtained gel is pre-frozen at −20° C. for several hours until there is no separated liquid on the surface of the gel structure, and then frozen-drying at −60° C. for 48 h to obtain the required composite aerogel containing GDY@rGO and rGO, and the required composite aerogel containing GDY@rGO and rGO is denoted as 20 GDY@rGO, suggesting that the composite aerogel is prepared based on the precursor solution of 20 mg HEB-TMS.

Embodiment 2

(1) 0.5 mL of tetrabutylammonium fluoride is added into 30 mL of tetrahydrofuran solution containing 40 mg HEB-TMS, and stirred for 14 min at 0° C. in argon atmosphere in the dark; the mixed solution is extracted with saturated sodium chloride solution and ethyl acetate while shaking, and stood for layering, with the lower liquid discharged, and the operation is and repeated for three times; the obtained solution is filtered and dried with anhydrous magnesium sulfate, and the light yellow monomer HEB is was obtained by rotary evaporation with a rotary evaporator;

(2) the three-necked flask is transferred to an oil bath pot at 30-60° C., and aerated for 5-10 min in argon atmosphere; graphene oxide (50 mg), pyridine (40 mL) and copper acetate (40 mg) are added into the three-necked flask, with a dropping funnel containing hexaethynyl benzene monomer solution inserted into the caliber of the three-necked flask, and the drops are added drop by drop into the mixed solution in the three-necked flask, followed by reacting in argon atmosphere in the dark for 24 h to obtain a dispersion with GDY@GO nanosheets; the dispersion with GDY@GO nanosheets is then successively centrifugally filtered with pyridine, dimethylformamide, ethanol, 1M hydrochloric acid and deionized water to obtain GDY@GO nanosheets, and then naturally dried to obtain GDY@GO powder;

(3) another GO nanosheet with 3 times the mass of GDY@GO powder is taken and dispersed with GDY@GO powder in 20 mL of pure water at a concentration of 3 mg/mL, followed by ultrasonic treatment for 6 h; 1 mL of polyvinyl alcohol solution with a concentration of 0.1 g/mL is added to the obtained dispersion, and ultrasonic treatment is continued for half an hour; the mixed dispersion is then transferred to a 50 mL stainless steel autoclave lined with polytetrafluoroethylene and heated at 180° C. for 12 h, and then the gel structure is repeatedly washed with ethanol and deionized water; and (4) the obtained gel is pre-frozen at −20° C. for several h until there is no separated liquid on the surface of the gel structure, and then frozen-drying at −60° C. for 48 h to obtain the required composite aerogel containing GDY@rGO and rGO, which is denoted as 40 GDY@rGO, suggesting that the composite aerogel is prepared based on the precursor solution of 40 mg HEB-TMS.

Embodiment 3

(1) 0.8 mL of tetrabutylammonium fluoride is added into 40 mL of tetrahydrofuran solution containing 60 mg HEB-TMS, and stirred for 14 min at 0° C. in argon atmosphere in the dark; the mixed solution is extracted with saturated sodium chloride solution and ethyl acetate while shaking, and stood for layering, with the lower liquid discharged, and the operation is and repeated for three times; the obtained solution is filtered and dried with anhydrous magnesium sulfate, and the light yellow monomer HEB is was obtained by rotary evaporation with a rotary evaporator;

(2) the three-necked flask is transferred to an oil bath pot at 30-60° C., and aerated for 5-10 min in argon atmosphere; graphene oxide (50 mg), pyridine (60 mL) and copper acetate (60 mg) are added into the three-necked flask, with a dropping funnel containing hexaethynyl benzene monomer solution inserted into the caliber of the three-necked flask, and the drops are added drop by drop into the mixed solution in the three-necked flask, followed by reacting in argon atmosphere in the dark for 24 h to obtain a dispersion with GDY@GO nanosheets; the dispersion with GDY@GO nanosheets is then successively centrifugally filtered with pyridine, dimethylformamide, ethanol, 1M hydrochloric acid and deionized water to obtain GDY@GO nanosheets, and then naturally dried to obtain GDY@GO powder;

(3) another GO nanosheet with 3 times the mass of GDY@GO powder is taken and dispersed with GDY@GO powder in 20 mL of pure water at a concentration of 3 mg/mL, followed by ultrasonic treatment for 6 h; 1 mL of polyvinyl alcohol solution with a concentration of 0.1 g/mL is added to the obtained dispersion, and ultrasonic treatment is continued for half an hour; the mixed dispersion is then transferred to a 50 mL stainless steel autoclave lined with polytetrafluoroethylene and heated at 180° C. for 12 h, and then the gel structure is repeatedly washed with ethanol and deionized water; and (4) the obtained gel is pre-frozen at −20° C. for several h until there is no separated liquid on the surface of the gel structure, and then frozen-drying at −60° C. for 48 h to obtain the required composite aerogel containing GDY@rGO and rGO, which is denoted as 60 GDY@rGO, suggesting that the composite aerogel is prepared based on the precursor solution of 60 mg HEB-TMS.

Embodiment 4

(1) 1 mL of tetrabutylammonium fluoride is added into 50 mL of tetrahydrofuran solution containing 80 mg HEB-TMS, and stirred for 14 min at 0° C. in argon atmosphere in the dark; the mixed solution is extracted with saturated sodium chloride solution and ethyl acetate while shaking, and stood for layering, with the lower liquid discharged, and the operation is and repeated for three times; the obtained solution is filtered and dried with anhydrous magnesium sulfate, and the light yellow monomer HEB is was obtained by rotary evaporation with a rotary evaporator;

(2) the three-necked flask is transferred to an oil bath pot at 30-60° C., and aerated for 5-10 min in argon atmosphere; graphene oxide (50 mg), pyridine (80 mL) and copper acetate (80 mg) are added into the three-necked flask, with a dropping funnel containing hexaethynyl benzene monomer solution inserted into the caliber of the three-necked flask, and the drops are added drop by drop into the mixed solution in the three-necked flask, followed by reacting in argon atmosphere in the dark for 24 h to obtain a dispersion with GDY@GO nanosheets; the dispersion with GDY@GO nanosheets is then successively centrifugally filtered with pyridine, dimethylformamide, ethanol, 1M hydrochloric acid and deionized water to obtain GDY@GO nanosheets, and then naturally dried to obtain GDY@GO powder;

(3) another GO nanosheet with 3 times the mass of GDY@GO powder is taken and dispersed with GDY@GO powder in 20 mL of pure water at a concentration of 3 mg/mL, followed by ultrasonic treatment for 6 h; 1 mL of polyvinyl alcohol solution with a concentration of 0.1 g/mL is added to the obtained dispersion, and ultrasonic treatment is continued for half an hour; the mixed dispersion is then transferred to a 50 mL stainless steel autoclave lined with polytetrafluoroethylene and heated at 180° C. for 12 h, and then the gel structure is repeatedly washed with ethanol and deionized water; and (4) the obtained gel is pre-frozen at −20° C. for several h until there is no separated liquid on the surface of the gel structure, and then frozen-drying at −60° C. for 48 h to obtain the required composite aerogel containing GDY@rGO and rGO, which is denoted as 80 GDY@rGO, suggesting that the composite aerogel is prepared based on the precursor solution of 80 mg HEB-TMS.

The properties of composite aerogels 20 GDY@rGO, 40 GDY@rGO, 60 GDY@rGO and 80 GDY@rGO containing GDY@rGO and GO prepared in Embodiments 1 to 4 are analyzed below. As a comparison, the disclosed examples also provide experimental data of rGO nanosheets.

In addition, GO nanosheets and GDY@GO nanosheets with different HEB-TMS contents are prepared on the silicon substrate in the embodiments of the present disclosure to further understand the coverage thickness of graphdiyne elements.

FIG. 2A-FIG. 2E are atomic force microscope images provided by the embodiment of the present disclosure, specifically, FIG. 2A-FIG. 2E are the atomic force microscope images of GO nanosheet and GDY@GO nanosheets with 20 mg, 40 mg, 60 mg and 80 mg of HEB-TMS respectively. Among them, the white dotted lines represent the height difference Δh, indicating the thickness of the nanosheet.

It is observed in the FIG. 2A-FIG. 2E that compared to GO nanosheets, the thickness of GDY@GO nanosheets increases at all HEB-TMS contents, indicating that GDY grows smoothly on the GO surface; moreover, the thickness of GDY@GO nanosheets increases gradually with the increase of HEB-TMS content, which varies from about 6 nanometers (nm) to 19 nm, and the thickness of GO unilaterally coated with GDY is about 1.5 nm to 7.6 nm.

Figure 3:
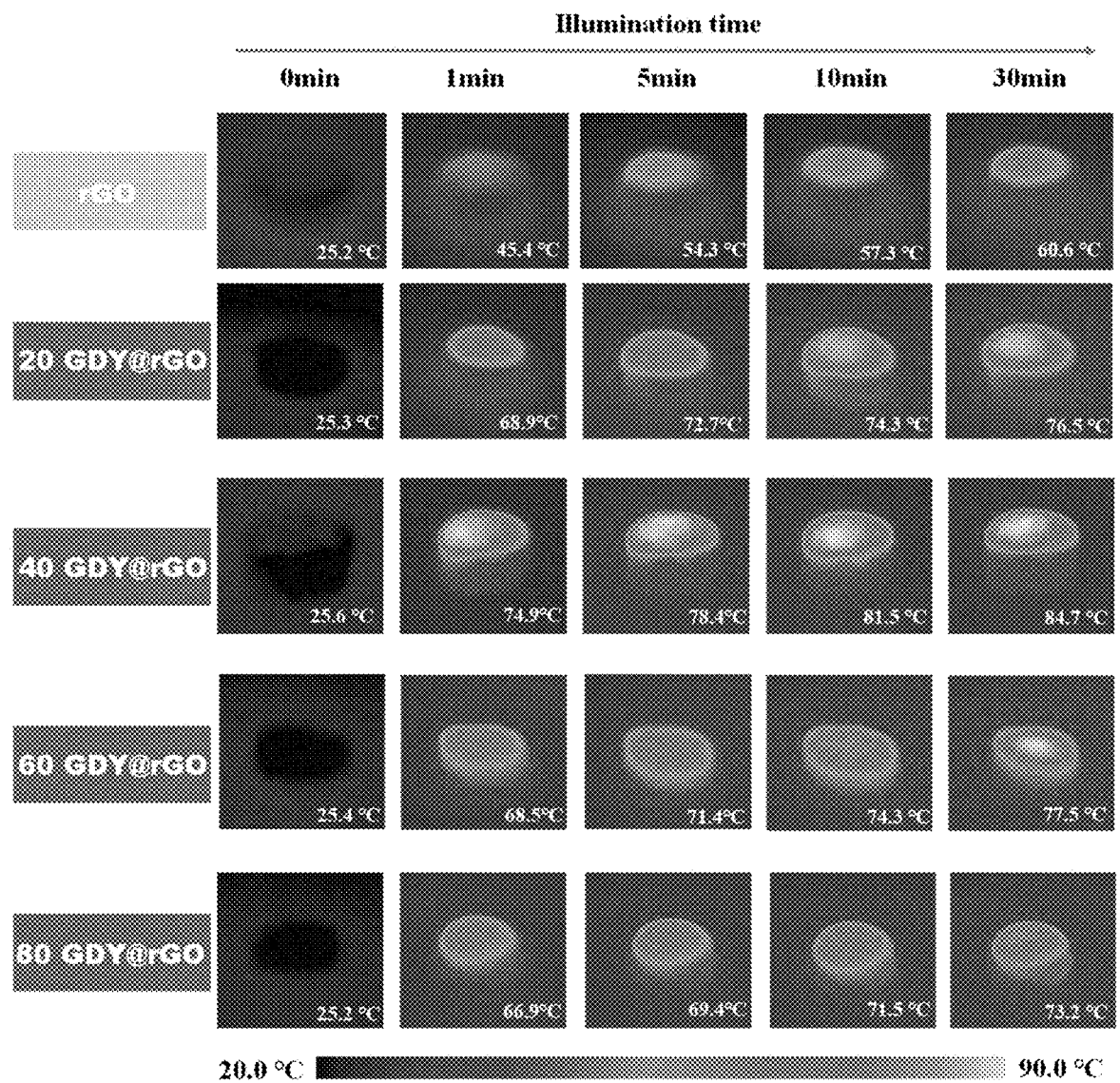
FIG. 3 is an infrared spectrogram provided by an embodiment of the present disclosure.

FIG. 3 is an infrared spectrogram provided by an embodiment of the present disclosure, illustrating the infrared spectrum of rGO aerogels and GDY@rGO composite aerogels with HEB-TMS contents of 20 mg, 40 mg, 60 mg and 80 mg respectively under the irradiation of one sunlight.

As shown in FIG. 3, the surface temperature of GDY@rGO composite aerogels with all HEB-TMS contents under one solar irradiation is higher than that of rGO aerogels, indicating that the introduction of GDY inhibits heat dissipation and improves the light-heat conversion efficiency. Moreover, when the content of HEB-TMS is 40 mg, the surface temperature of GDY@rGO composite aerogel is the highest, reaching 74.9° C. after irradiation for 1 min and 84.7° C. after irradiation for 30 min. In contrast, the surface temperature of GDY@rGO composite aerogels with other HEB-TMS content is decreased, which may be due to the influence of the thickness of GDY@GO nanosheets on their dispersion in the aerogel structure. A lower thickness indicates less growth of graphdiyne and weaker inhibition of thermal dissipation; a higher thickness leads to a reduction of oxidation groups, which is unfavourable to the uniform dispersion of GDY@rGO nanosheets within the aerogel, weakening the effectiveness of inhibiting thermal dissipation.

Figure 4:
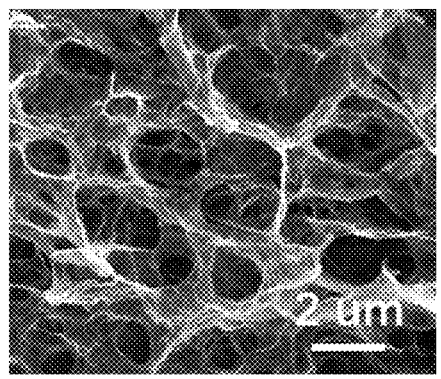
FIG. 4 is a scanning electron microscope image provided by an embodiment of the present disclosure.

FIG. 4 is a scanning electron microscope image provided by the embodiment of the present disclosure; FIG. 4 shows the three-dimensional structure of GDY@rGO composite aerogel with a content of HEB-TMS of 40 mg.

As shown in FIG. 4, the three-dimensional network structure of GDY@rGO composite aerogel is uniform, with clear pore morphology and pore sizes of about a few micrometres, forming a backbone that promotes the water transport micrometre channels, and, there is no agglomeration, suggesting that the GDY@rGO nanosheets are homogeneously dispersed in the network structure at this HEB-TMS content.

In addition, the embodiments of the present disclosure also provide evaporators based on GDY@rGO composite aerogels with different HEB-TMS contents and test the change of water mass with respect to duration under 1 solar irradiation.

Figure 5:
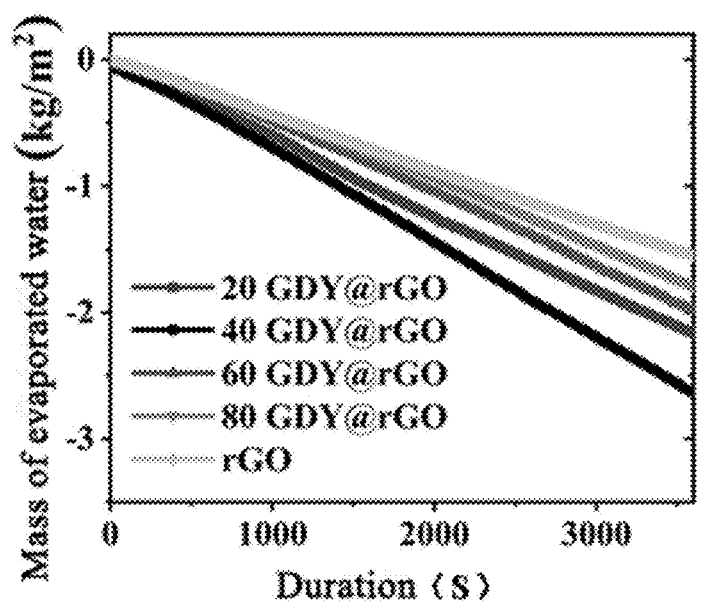
FIG. 5 is a graph showing a relationship between a quality of evaporated water and duration provided by an embodiment of the present disclosure.

FIG. 5 is a graph showing the relationship between the evaporated water quality and duration provided by the embodiment of the present disclosure, which is used to show the relationship between the evaporated water quality and duration of GDY@rGO composite aerogels with different HEB-TMS contents under 1 solar irradiation.

Table 1 shows the change rate (i.e. the evaporating efficiency) of rGO aerogel and GDY@rGO composite aerogels with HEB-TMS contents of 20 mg, 40 mg, 60 mg and 80 mg respectively under 1 solar irradiation.

TABLE 1

| Name | rGO | 20 GDY@rGO | 40 GDY@rGO | 60 GDY@rGO | 80 GDY@rGO |
|---|---|---|---|---|---|
| Evaporating efficiency (kg/m$^2$/h) | 1.48 | 2.14 | 2.52 | 1.92 | 1.78 |

It is observed from FIG. 5 and Table 1 that the evaporating efficiency of rGO aerogel is 1.48 kg/m$^2$/h under 1 solar irradiation, and the evaporating efficiency of GDY@rGO composite aerogels with different HEB-TMS contents is higher than that of rGO aerogel, suggesting that after the introduction of GDY, the heat dissipation may be effectively suppressed by using the thermal conductivity characteristics of GDY, and the heat of evaporating water may be increased, thus accelerating the evaporating efficiency. Moreover, the evaporation efficiency reaches an optimal rate of 2.52 kg/m$^2$/h at a HEB-TMS content of 40 mg, which is consistent with the results illustrated in FIG. 3.

FIG. 6 is a comparison diagram of evaporating efficiency and photothermal conversion efficiency provided by an embodiment of the present disclosure.

The comparison results of evaporating efficiency and photothermal conversion efficiency of water, rGO aerogel and 40 GDY@rGO composite aerogel under 1 solar irradiation are illustrated in the FIG. 6, and it should be noted that under the condition that the relative evaporation enthalpy of water is constant, the photothermal conversion efficiency is directly proportional to the evaporating efficiency.

As can be seen from FIG. 6, the evaporation efficiency of the 40 GDY@rGO composite aerogel is much higher compared to that of the water and the rGO aerogel, and, the photothermal conversion efficiency reaches about 95.5%, indicating that the GDY@rGO composite aerogel provided by the embodiments of the present disclosure is able to effectively inhibit heat dissipation and improve the photothermal conversion efficiency.

Table 2 shows the evaporation efficiencies of water, rGO aerogel and 40 GDY@rGO composite aerogel under 0.1 to 1 sunlight irradiation, in kg/m$^2$/h.

TABLE 2

| | Light intensity | | | | |
|---|---|---|---|---|---|
| | 0.1 | 0.2 | 0.3 | 0.4 | 0.5 |
| water | 0.15 | 0.23 | 0.32 | 0.38 | 0.43 |
| rGO | 0.23 | 0.37 | 0.53 | 0.75 | 0.84 |
| GDY@rGO | 0.52 | 0.71 | 0.97 | 1.24 | 1.49 |
| | Light intensity | | | | |
| | 0.6 | 0.7 | 0.8 | 0.9 | 1 |
| water | 0.45 | 0.46 | 0.48 | 0.50 | 0.52 |
| rGO | 1.02 | 1.16 | 1.27 | 1.35 | 1.48 |
| GDY@rGO | 1.75 | 1.94 | 2.17 | 2.35 | 2.52 |

Referring to Table 2, the evaporation efficiency of the composite aerogel 40 GDY@rGO reaches 0.97 kg/m$^2$/h in 0.3 sunlight compared with water and rGO aerogel, indicating that it has high evaporation performance even in low light, offering a very broad application prospect in harsh outdoor environments.

In the description of this specification, reference to the terms "an embodiment/mode", "some embodiments/modes", "examples", "specific examples", or "some examples" means that the specific features, structures, materials, or characteristics described in conjunction with the embodiment/mode or example are included in at least one embodiment/mode or example of the present application. In this specification, schematic representations of the above terms need not be directed to the same embodiments/modes or examples. Moreover, the specific features, structures, materials, or characteristics described may be combined in a suitable manner in any one or more of the embodiments/modes or examples. Furthermore, without contradicting each other, those skilled in the art may combine and integrate different embodiments/modes or examples and features of different embodiments/modes or examples described in this specification.

Furthermore, the terms "first" and "second" are used for descriptive purposes only and are not to be understood as indicating or implying relative importance or implicitly specifying the number of technical features indicated. Thus, a feature defined with the terms "first", "second" may expressly or implicitly include at least one such feature. In the description of the present application, "plurality" means at least two, e.g., two, three, etc., unless otherwise expressly and specifically limited.

It should be understood by those skilled in the art that the above embodiments are merely for the purpose of clearly illustrating the present disclosure and are not intended to limit the scope of the present disclosure. For those skilled in the art, other changes or variations may be made on the basis of the above disclosure, and such changes or variations remain within the scope of the present disclosure.

What is claimed is:

1. A preparation method of a composite aerogel based on a graphdiyne motif arrangement, comprising:
   step S1, performing coupling reaction on a graphene oxide and a hexaethynyl benzene monomer, and growing graphdiyne on a surface of the graphene oxide to obtain a graphdiyne-coated graphene oxide;
   step S2, taking an additional graphene oxide, adding the additional graphene oxide and the graphdiyne-coated graphene oxide obtained by the coupling reaction into pure water, and ultrasonically mixing to obtain a mixed dispersion;
   step S3, adding a polyvinyl alcohol aqueous solution into the mixed dispersion, and transferring to a reaction kettle after ultrasonic mixing;
   step S4, putting the reaction kettle after sealing into a blast drying box for hydrothermal reaction to obtain a gel structure; and
   step S5, cleaning the gel structure, and freeze-drying to obtain a composite aerogel containing graphdiyne-coated reduced graphene oxide and reduced graphene oxide;
   in the step S2, a mass ratio of the additional graphene oxide to the graphdiyne-coated graphene oxide obtained by the coupling reaction is 3/1-5/1;
   in the step S2, a total concentration of the graphene oxide and the graphdiyne-coated graphene oxide in the mixed dispersion is 0.001 g/mL to 0.01 g/mL; and
   in the step S4, the reaction kettle is a stainless steel autoclave, and the stainless steel autoclave is put into a blast drying box and is heated to 130-200° C. and reacted for 7 h-16 h to obtain the gel structure.

2. The preparation method of the composite aerogel based on a graphdiyne motif arrangement according to claim 1, wherein in the step S5, the gel structure is washed with ethanol and deionized water, and the gel structure after washing is pre-frozen at −10° C.−−20° C. until there is no separated liquid on a surface of the gel structure, and then transferred to −30° C.−−80° C. for freeze-drying to obtain the composite aerogel containing graphdiyne-coated reduced graphene oxide and reduced graphene oxide.

3. The preparation method of the composite aerogel based on a graphdiyne motif arrangement according to claim 1, wherein the step S1 comprises: transferring a three-necked flask to an oil bath at 30° C.-60° C. and ventilating under an argon atmosphere for 5 min-10 min; taking graphene oxide, and mixing graphene oxide, pyridine and copper acetate together in the three-necked flask; inserting a dropping funnel containing hexaethynyl benzene monomer solution into a caliber of the three-necked flask, dropwise adding droppings into a mixed solution in the three-necked flask, and completely reacting in a darkness to obtain a dispersion containing graphdiyne-coated graphene oxide nanosheets; carrying out centrifugal suction filtration on the dispersion containing graphdiyne-coated graphene oxide nanosheets with pyridine, dimethylformamide, ethanol, hydrochloric acid and deionized water in turn to obtain the graphdiyne-coated graphene oxide nanosheets; and drying the graphdiyne-coated graphene oxide nanosheets obtained by suction filtration to obtain powdered graphdiyne-coated graphene oxide.

4. The preparation method of the composite aerogel based on a graphdiyne motif arrangement according to claim 1, wherein synthesizing the hexaethynyl benzene monomer from hexakis-[(trimethylsilyl)ethynyl]benzene is also comprised before the step S1, and a mass ratio of hexakis-[(trimethylsilyl)ethynyl]benzene needed for synthesizing the hexaethynyl benzene monomer in the step S1 to graphene oxide in the step S1 is 2/5-8/5.

5. A composite aerogel containing graphdiyne-coated reduced graphene oxide and reduced graphene oxide, wherein the composite aerogel is prepared according to the preparation method of the composite aerogel based on a graphdiyne motif arrangement according to claim 1.

* * * * *